(12) United States Patent
Caldwell

(10) Patent No.: US 8,357,409 B2
(45) Date of Patent: Jan. 22, 2013

(54) CRISPY CHIP GARNISH SANDWICH

(76) Inventor: Russell L. Caldwell, Garden Prairie, IL (US)

( * ) Notice: Subject to any disclaimer, the term of this patent is extended or adjusted under 35 U.S.C. 154(b) by 0 days.

(21) Appl. No.: 10/320,228

(22) Filed: Dec. 16, 2002

(65) Prior Publication Data

US 2004/0115311 A1 Jun. 17, 2004

(51) Int. Cl.
*A23L 1/00* (2006.01)

(52) U.S. Cl. ............ 426/94; 426/92; 426/102; 426/275; 426/383; 426/637

(58) Field of Classification Search ............... 426/92, 426/94, 102, 275, 383, 637
See application file for complete search history.

(56) References Cited

U.S. PATENT DOCUMENTS

| | | | |
|---|---|---|---|
| 4,455,321 A * | 6/1984 | Glabe et al. .................. 426/549 |
| 4,765,998 A * | 8/1988 | Pak et al. ...................... 426/92 |
| 4,879,125 A | 11/1989 | Pak |
| 4,919,946 A | 4/1990 | Pak et al. |
| 5,787,684 A * | 8/1998 | Compton ........................ 53/448 |
| 2002/0150656 A1* | 10/2002 | Farnsworth et al. ............ 426/94 |

OTHER PUBLICATIONS

Bob Bobala, "Pickle Fribble: The Dill Apocalypse," http://www.fool.com/Fribble/1998/Fribble981014.htm, Oct. 14, 1998.*
Barrett. Knight Ridder/Tribune Business News. "Claussen marketing Massive Pickle Slice for Burgers." May 15, 1997.*
Vlasic Website. 2002. http://web.archive.org/web/20020607042933/www.vlasic.com/pickles/default.htm.*
Sherman. The Pickle That Ate Your hamburger. 1999. St. Petersburg Times.*
A Symposium. Issue 545. 1973. Pages 128-131 and 137.*
Yahoo Dictionary Definition. "Burger". 2009. http://education.yahoo.com/reference/dictionary/entry/burger.*

* cited by examiner

*Primary Examiner* — Anthony Weier
(74) *Attorney, Agent, or Firm* — Reinhard Boerner Van Deuren P.C.

(57) ABSTRACT

A sandwich-sized crispy chip garnish is provided with desired color, flavor and surface presentations for use in a crispy chip sandwich.

15 Claims, 3 Drawing Sheets

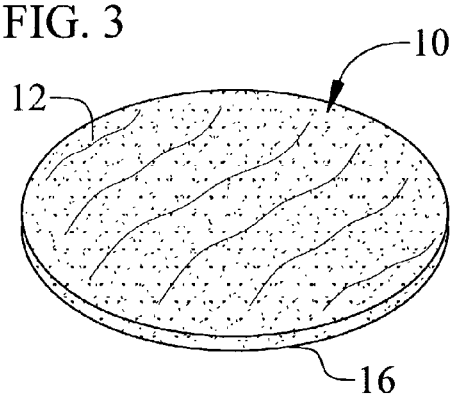
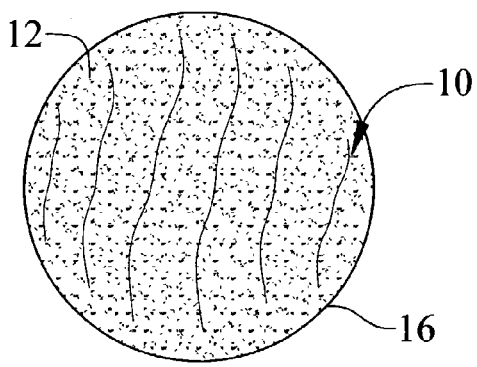
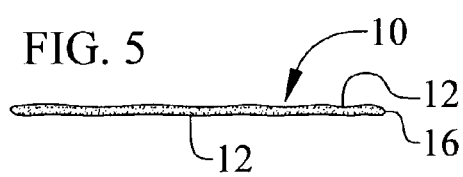
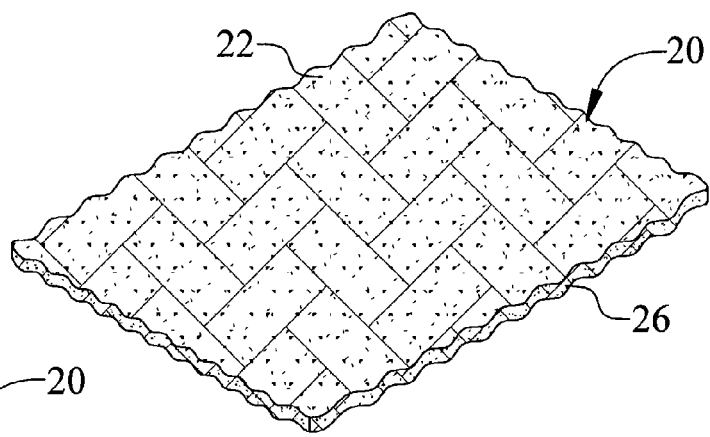
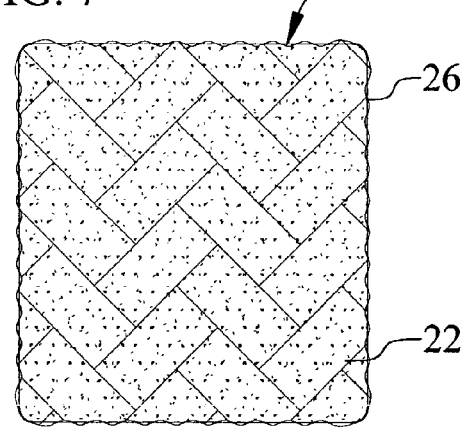
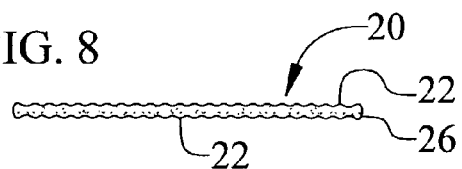

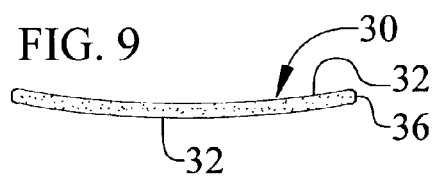
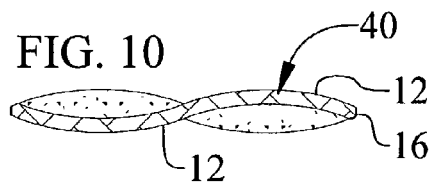
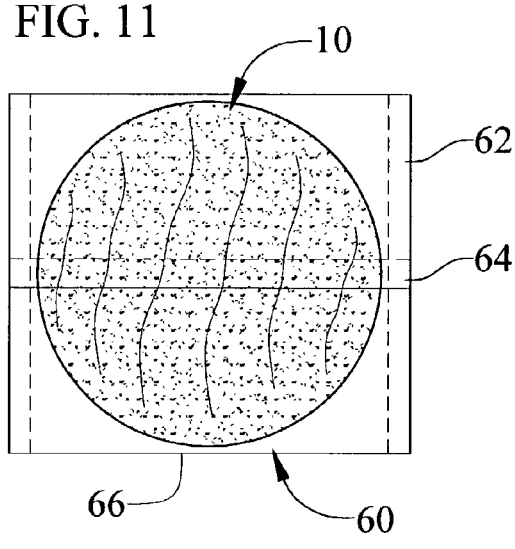
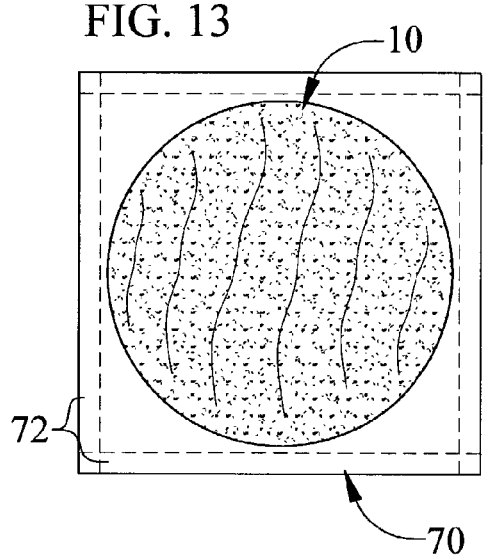
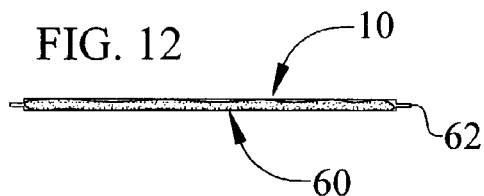

CRISPY CHIP GARNISH SANDWICH

CROSS-REFERENCES TO RELATED APPLICATIONS

None.

Statement Regarding Federally Sponsored Research Or Development: Not Applicable.

Reference To Microfiche Appendix: Not Applicable.

BACKGROUND OF THE INVENTION

1. Field of Invention

The present invention relates generally to food products. More particularly, the invention relates to crispy chip sandwich products in the form of crispy chip sandwich garnishes and sandwiches made therewith.

2. Description of Prior Art

Sandwiches of all kinds, both hot and cold, are popular food products in our society. For example, many individuals enjoy the taste of chips on lunch meat, hamburgers and other types of sandwiches. The common method to achieve such culinary delight is to place a pile of potato chips or corn chips on the sandwich, and mash the chips between the bread to maintain the chips in position while eating the sandwich. However, there are certain drawbacks and disadvantages to this scenario. A diner may need to open a new bag of chips, even if he or she does not want additional chips with the sandwich. Mashing and holding the chips in the sandwich can cause the chips to breakup, allowing smaller pieces of broken chips to fall out while eating the sandwich. Chips may not always be available to the diner when desired, such as when a bag of chips is not in the cupboard, or when eating in a restaurant that does not offer chips with sandwiches. And there is a potential for injury to the diner's gums when biting into larger pieces of chips with vertically exposed edges in the sandwich.

A pre-made, substantially flat, crispy chip garnish and the sandwich made therewith would help to eliminate these drawbacks and disadvantages, and would provide the diner with a safer, easy to handle, unique sandwich, thus satisfying an ever present demand for related culinary innovations. However, such a pre-made crispy chip sandwich garnish is currently not known or available.

One prior sandwich product that suggests presentation of a fried potato chip filler, and elimination of the need to place loose potato chips on a sandwich, is illustrated in Pak et al., U.S. Pat. Nos. 4,765,998, 4,879,125 and 4,919,946. Briefly, these patents show an edible food bowl that the patents indicate may be made with a fried potato composition, including a french fried potato chip filler, and that is placed in a sandwich to hold additional sandwich ingredients. However, use of this bowl without additional ingredients is not suggested in these patents, nor would such use be practical or desirable from a culinary standpoint as it would result in the diner simply eating an empty bowl positioned in the sandwich. Moreover, in the event the bowl were actually fried to a crispy chip condition, biting through the substantially vertical sides of the bowl would result in the diner bringing his or her teeth into the crispy sides in a direction that would be dangerous to his or her gums. Any vertically exposed sharp edges in the sides of the bowl, either prior to or as a result of biting into bowl, presents the potential that such sharp edges will cut into the diner's gums. Consequently, although the subject patents suggests that this product eliminates the need for loose chips in a sandwich, use of the product in this manner is less than desirable, and presents potential danger to the diner.

SUMMARY OF THE INVENTION

The general aim of the present invention is to provide a new and unique sandwich product in the form of a crispy chip sandwich garnish, and the sandwiches made therewith.

A detailed objective of the invention is to provide a crispy chip garnish that is easier and safer to use as compared with prior food products and processes for providing a sandwich with a crispy chip content.

Another detailed objective is to provide such crispy chip garnishes in a form suitable for use in many types of sandwiches.

These and other objectives and advantages of the invention will become more apparent from the following detailed description when taken in conjunction with the accompanying drawings.

Briefly, a sandwich in accordance with the invention is provided with a generally flat crispy chip garnish that is either generally bun sized and shaped for complimentary use in a bun sandwich, or generally sliced-bread sized and shaped for complimentary use in a sliced bread sandwich. The crispy chip garnish is further provided with a variety of color, flavor and surface presentations to enhance the dining experience.

More particularly, there is provided a sandwich product comprising two pieces of bread, such as two slices of bread or a two-part hamburger bun, the focal point of the sandwich, such as a serving of meat (e.g., a stack of lunch meat or a hamburger) or a serving of vegetables in a vegetarian sandwich (hereinafter referred to as the "meat" of the sandwich), and a substantially flat, crispy chip garnish disposed between the meat and the bread. The crispy chip garnish is sized to substantially extend to the perimeter of the bread for presentation of the crispy chip garnish throughout the sandwich. The preferred crispy chip garnish is made from either a potato-based composition or a corn-based composition, and may include additional flavoring such as cheese, nacho cheese, onion, smoke, salsa, sour cream, chili, barbeque, smoke and vinegar. The crispy chip garnish may be provided in individual-wrap packaging that, among other things, provides for sanitary dispensing of the garnishes, helps keep the crispy chip garnishes fresh during storage, and enables convenient packaging of differently flavored garnishes in a multi-garnish pack.

In accordance with another aspect of the invention, the preferred crispy chip sandwich garnish is particularly characterized as sized at (i) one of (a) between approximately three (3) to four and one-half (4½) inches in diameter, and (b) between approximately three (3) to four (4) inches by four (4) to five (5) inches rectangular, and (ii) between approximately one-sixteenth (1/16) to three-sixteenth (3/16) inch thick.

These and other embodiments and aspects of the invention are shown and described in further detail below.

BRIEF DESCRIPTION OF THE DRAWINGS

FIGS. 3-5 are perspective, top and side views, respectively, of a crispy chip garnish in accordance with the invention.

FIGS. 6-8 are perspective, top and side views, respectively, of an alternate crispy chip garnish.

FIGS. 9-10 are sides view of two additional alternate crispy chip garnishes.

FIGS. 11-12 are top and side views, respectively, of an individually packaged crispy chip garnish.

FIG. 13 is a top view of an alternately individually packaged crispy chip garnish.

Figure 1:
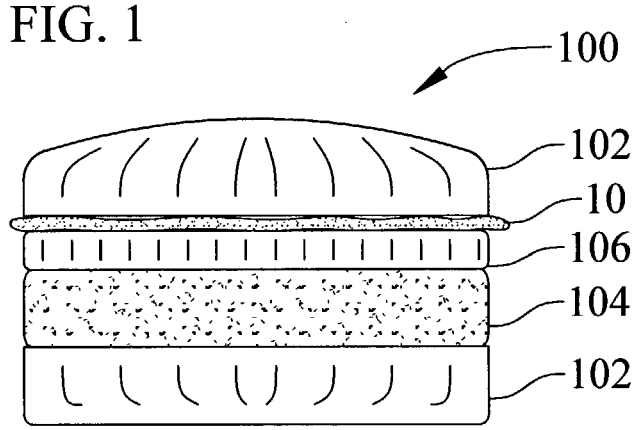
FIG. 1 is a side view of a crispy chip sandwich in accordance with the invention and provided with the crispy chip garnish shown in FIGS. 3-5.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

Figure 2:
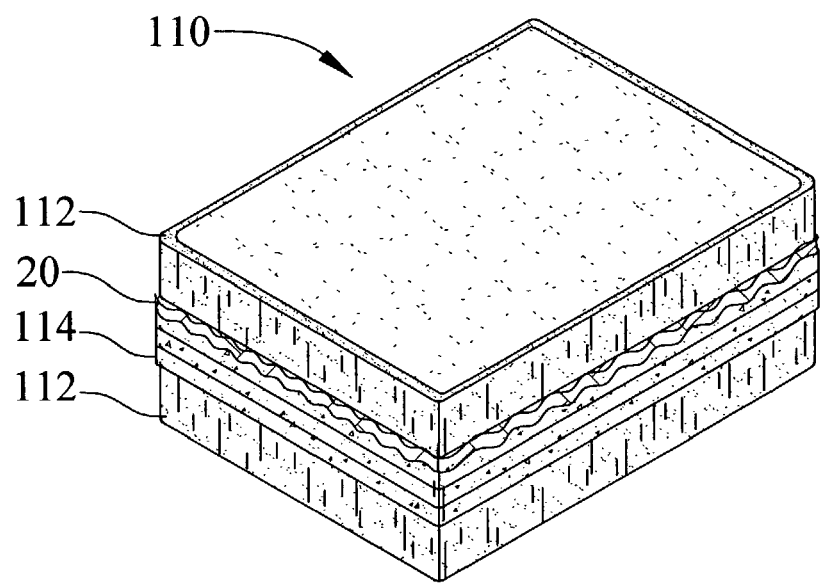
FIG. 2 is a perspective view of an alternate sandwich provided with the crispy chip garnish shown in FIGS. 6-8.

For purposes of illustration, a sandwich 100 is shown in the drawings in FIG. 1, and an alternate sandwich 110 is shown in FIG. 2. The sandwich 100 includes a two-part hamburger bun 102, a hamburger 104, and sliced tomato or onion garnish 106. The sandwich 110 includes two slices of bread 112, and a stack of lunchmeat 114. In carrying out the invention, the hamburger sandwich 100 further includes a bun sized crispy chip garnish 10 positioned between the hamburger and the bun, and the lunchmeat sandwich 110 includes an alternate bread sized crispy chip garnish 20 positioned between the lunchmeat and the bread.

Preferred embodiment crispy chip garnishes are shown as generally round garnish in FIGS. 3-5, and as generally rectangular garnish 20 in FIGS. 6-8. The side-profile of two additional crispy chip garnish configurations 30 and 40 are shown in FIGS. 9-10.

In general, the crispy chip garnishes are substantially flat so as to present no vertically exposed edges of substantial height. The crispy chip garnishes are relatively thin, established having a substantially constant material thickness approximately equal to or slightly greater that the thickness of common thicker conventional chips. And the crispy chip garnishes are sized to extend to proximate the perimeter of conventional sized sandwiches, as defined by the perimeter of the bread portions in the sandwich, and to generally fill the spaced surrounded by the perimeter of the sandwich for a crispy chip presence throughout the sandwich.

More particularly, the crispy chip garnishes 10, 20, 30, 40 are formed with oppositely facing, generally parallel top and bottom faces 12, 22, 32, 42 to establish substantial face-to-face contacting relation with the meat and bread and/or additional garnish in a sandwich, and encircling terminal sides 16, 26, 36, 46 extending between the top and bottom faces to define the perimeter of the respective garnish, the product being further characterized by the absence of up or down standing sides and vertically exposed edges extending from the top and bottom faces. The garnishes are provided with a material thickness between the top and bottom faces (not including any curvature or waviness of the chip) of between approximately one-sixteenth ($1/16$) to three-sixteenth ($3/8$) inch The crispy chip garnish 10 is generally bun sized, and is particularly characterized as sized at between approximately three (3) to four and one-half ($4\frac{1}{2}$) inches in diameter (when viewed from above as in FIG. 4). The garnish 20 is generally sliced bread sized, and is particularly characterized as at between approximately three (3) to four (4) inches by four (4) to five (5) inches rectangular. The crispy chip garnishes are further provided with (i) a desired color presentation of a natural potato color or specialty colors, (ii) a desired surface texture and side-profile presentation, such as the slightly wavy crispy chip 10, the criss-cross wavy crispy chip 20, the concave-curved crispy chip 30, the compound-wave crispy chip 40, of a crispy chip with repeated ridges (not shown), and (iii) a desired flavor presentation, such as salted or unsalted natural potato flavor, and/or additional garnish, condiment, sauce, spice, seasoning or other flavoring such as cheese, nacho cheese, onion, smoke, salsa, sour cream, chili, barbeque, smoke, tomato, pickle, bacon, horseradish, pepper, honey, lemon, garlic, parmesan, butter, malt and vinegar.

During processing, the crispy chip garnishes are pre-formed as shown, cooked and otherwise processed, and then packaged and delivered to user in a fully-cooked crispy chip condition such that they can be stored in the same manner as conventional chips, for conventional chip-storage periods of time, without the need for refrigeration or other special storage considerations. More particularly, the crispy chip garnishes are pre-formed from a suitable potato-based or corn-based chip composition and chip preparation process such as known in the arts into regularly sized and shaped pre-formed chip blanks. The pre-formed chip blanks are then baked, fried or otherwise cooked, and further processed with addition of salt and/or other flavoring in a conventional chip processing manner. The finished crispy chip garnishes are then stacked and packaging for storage and delivery to the user as in individual packages, multi-unit packs or bulk packaging.

In a preferred embodiment, the crispy chip garnishes are individually packaged prior to stacking and further packaging as into multi-unit packs. Referring to FIGS. 11-12 there is shown a crispy chip garnish 10 individually packaged in a fold-over type single-ply sealing wrap plastic film packaging 60, with folded ends 66, sealed sides 62, and a flap 64 to grab and peal back the wrap from the chip, such as commonly used with individually wrapped cheese slices. Alternately, there is shown in FIG. 13 a wrap package 70 of a type with sealed sides 72 surrounding the crispy chip garnish and that is torn or cut open. Advantageously, individual packaging of the crispy chip garnishes enables sanitary grabbing or dispensing from a multi-pack unit or bulk packaging, and particularly insures that the individual crispy chip garnishes will stay fresh when purchased in such quantity packaging after the package has been opened. This enables the infrequent, home or small quantity user to purchase a multi-unit pack without concern that the unused crispy chip garnishes will become prematurely stale after the pack is opened. The diner simply opens one garnish package for each sandwich, and returns the unused, individually sealed garnishes to storage for later use. This also enables packaging of differently flavored crispy chip garnishes into a multi-unit pack, with the individual packaging preventing cross-over of flavors between the crispy chip garnishes. The preferred multi-pack unit will include between approximately six (6) to ten (10) crispy chip garnishes, preferably of the approximately same regular side profile for stacking in the multi-pack, and provided in either individually wrapped packages, or in a re-sealable package, for purchase and use by the typical home consumer. For the larger families, a family-pack of between approximately ten (10) to twenty (20) crispy chip garnishes will be conveniently provided. Alternately, for intended use by commercial or other large volume users, the crispy chip garnishes may be bulk packaged with or without individual packaging of the garnishes.

From the foregoing it will be apparent that crispy chip garnishes in accordance herewith enables provision of a unique sandwich with a crispy chip content in the form of a single chip that reduces the inconvenience and other disadvantages associated with conventional practice of smashing a stack of chips in a sandwich. The crispy chip garnish eliminates the need to open an entire package of chips for the sole purpose of making a sandwich with a crispy chip content. The crispy chip garnish enables stocking and making available such unique sandwiches without the need to keep conventional chips on hand, and in restaurants that do not offer conventional chips. The individual wrapping of the crispy chip garnishes enables stocking of a wide variety of flavors without concern of unused garnishes becoming prematurely stale. And the wide variety of flavor presentations that can be stored in a relatively small space and made available to the diner will enhance the variety of available sandwiches, and may enhance the likelihood of enticing the diner to try a crispy chip sandwich.

I claim:

1. A sandwich product comprising:
  two bread portions including one of (i) two slices of bread, and (ii) two mating bun parts;
  a meat portion disposed between the bread portions; and
  a substantially flat, crispy chip garnish disposed between the meat portion and one of said bread portions, the crispy chip garnish being characterized as sized and shaped to substantially extend to the perimeter of said bread portions; the crispy chip garnish having substaintially parallel top and bottom faces and being further characterized by the absence of rigid up or down standing sides extending axially outward from said top and bottom faces
    wherein the substantially flat crispy chip garnish is sized and shaped to avoid the presence of vertically exposed edges of crispy chip that would otherwise have the protenial to injure the gums of the sandwich product consumer while consuming the sandwich product.

2. The sandwich product as defined in claim 1 in which the crispy chip garnish is made from one of (i) potato-based composition and (ii) corn-based composition.

3. The sandwich product as defined in claim 2 in which the crispy chip garnish includes a flavor selected from the group consisting of cheese, nacho cheese, onion, smoke, salsa, sour cream, chili, barbeque, smoke, tomato, pickle, bacon, horseradish, pepper, honey, lemon, garlic, parmesan, butter, malt and vinegar.

4. The sandwich product as defined in claim 1 in which the crispy chip garnish is further characterized as having a material thickness of between approximately one-sixteenth ($1/16$) to three-sixteenth ($3/16$) inch.

5. The sandwich product as defined in claim 1 in which the crispy chip garnish is further characterized as sized at one of (a) between approximately three (3) to four and one-half ($4\frac{1}{2}$) inches in diameter, and (b) between approximately three (3) to four (4) inches by four (4) to five (5) inches.

6. A sandwich product comprising:
  two bread portions including one of (i) two slices of bread, and (ii) two mating bun parts; and
  a substantially flat, crispy chip garnish disposed between the bread portions and characterized as
  (i) sized at one of
    (a) between approximately three (3) to four and one-half ($4\frac{1}{2}$) inches in diameter, and
    (b) between approximately three (3) to four (4) inches by four (4) to five (5) inches, and
  (ii) having a material thickness of between approximately one-sixteenth ($1/16$) to three-sixteenth ($3/16$) inch, a substantially flat, crispy chip garnish disposed between the meat portion and one of said bread portions, the crispy chip garnish being characterized as sized and shaped to substantially extend to the perimeter of said bread portions; the crispy chip garish having substantially parallel top and bottom faces and being further characterized by the absence of rigid up or down standing sides extending axially outward from said top and bottom faces
    wherein the substantially flat crispy chip garnish is sized and shaped to avoid the presence of vertically exposed edges of crispy chip that would otherwise have the potential to injure the gums of the sandwich product consumer while consuming the sandwich product.

7. The sandwich product as defined in claim 6 in which the crispy chip garnish is made from one of (i) potato-based composition and (ii) corn-based composition.

8. The sandwich product as defined in claim 7 in which the crispy chip garnish includes a flavor selected from the group consisting of cheese, nacho cheese, onion, smoke, salsa, sour cream, chili, barbeque, smoke, tomato, pickle, bacon, horseradish, pepper, honey, lemon, garlic, parmesan, butter, malt and vinegar.

9. The sandwich product as defined in claim 6 further comprising an individual-wrap removable package surrounding the crispy chip garnish.

10. The sandwich product as defined in claim 6 in which the crispy chip garnish is packaged in a multi-unit pack including between approximately six (6) to ten (10) crispy chip garnishes.

11. A sandwich product comprising:
  two bread portions including one of (i) two slices of bread, and (ii) two mating bun parts;
  a meat portion disposed between the bread portions; and
  a substantially flat crispy chip garnish disposed between said meat and one of said bread portions, the crispy chip garnish being characterized as
  (i) sized at one of
    (a) between approximately three (3) to four and one-half ($4\frac{1}{2}$) inches in diameter, and
    (b) between approximately three (3) to four (4) inches by four (4) to five (5) inches, and
  (ii) having a material thickness of between approximately one-sixteenth ($1/16$) to three-sixteenth ($3/16$) inch;
  the crispy chip garnish having substantially parallel top and bottom faces and being further characterized by the absence of rigid up or down standing sides extending axially outward from said top and bottom faces
    wherein the substantially flat crispy chip garnish is sized and shaped to avoid the presence of vertically exposed edges of crispy chip that would otherwise have the potential to injure the gums of the sandwich product consumer while consuming the sandwich product.

12. The sandwich product as defined in claim 11 in which the crispy chip garnish is made from one of (i) potato-based composition and (ii) corn-based composition.

13. The sandwich product as defined in claim 12 in which the crispy chip garnish includes a flavor selected from the group consisting of cheese, nacho cheese, onion, smoke, salsa, sour cream, chili, barbeque, smoke, tomato, pickle, bacon, horseradish, pepper, honey, lemon, garlic, parmesan, butter, malt and vinegar.

14. A method for making a sandwich product comprising:
  providing:
    (i) two bread portions including one of (i) two slices of bread, and (ii) two mating bun parts;
    (ii) a meat portion; and
    (iii) a substantially flat, crispy chip garnish in an individual-garnish package;
  positioning the meat portion between the bread portions; and
  opening said package;
  positioning the crispy chip garnish between said meat and one of said bread portions, the crispy chip garnish being characterized as sized and shaped to substantially extend to the perimeter of said bread portions; the crispy chip garnish having substantially parallel top and bottom faces and being further characterized by the absence of rigid up or down standing sides extending axially outward from said top and bottom faces
wherein the substantially flat crispy chip garnish is sized and shaped to avoid the presence of vertically exposed edges of crispy chip that would otherwise have the potential to injure the gums of the sandwich product consumer while consuming the sandwich product.

15. The method for making a sandwich as defined in claim 14 in which the crispy chip garnish being characterized as (i) sized at one of (a) between approximately three (3) to four and one-half (4½) inches in diameter, and (b) between approximately three (3) to four (4) inches by four (4) to five (5) inches, and (ii) having a material thickness of between approximately one-sixteenth (1/16) to three-sixteenth (3/16) inch.

* * * * *